3,152,179
2-(HYDROXY/OXY) - N,N - DI(LOWER ALKYL)-5-(6-METHOXY - 2 - NAPHTHYL)CYCLOPENTANE-ACETAMIDES AND CONGENERS
Robert B. Garland, Northbrook, Ill., assignor to G. D. Searle & Co., Chicago, Ill., a corporation of Delaware
No Drawing. Filed Mar. 22, 1963, Ser. No. 267,354
5 Claims. (Cl. 260—559)

This invention relates to 5-(alkoxy-2-naphthyl)-N,N-dialkyl-2-(hydroxy/oxy)cyclopentaneacetamides and congeners, and to processes whereby these new and useful chemical compounds can be produced. More particularly, this invention provides products of the formula

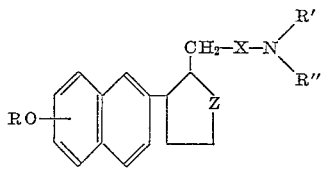

wherein RO represents an alkoxy radical, X represents a carbonyl or methylene radical, R' and R'' each represent an alkyl radical, and Z represents a carbonyl or hydroxymethylene radical.

The alkoxy radicals represented by RO can be attached to any one of carbon atoms 5, 6, 7, and 8 in the naphthalene ring—although the 6-position is preferred—and are most advantageously lower alkoxy radicals, which is to say radicals of the formula lower alkyl-O—

Similarly, the alkyl radicals represented by R' and R'' are desirably of lower order. [Those skilled in the art will recognize that lower alkyl radicals are monovalent, saturated, acyclic, straight- or branched-chain hydrocarbon radicals of the formula $-C_nH_{2n+1}$ wherein $n$ represents a positive integer less than 8, among which methyl, ethyl, propyl, isopropyl, sec-butyl, tert-butyl, pentyl, neopentyl, hexyl, isohexyl, and heptyl radicals are typical.]

Equivalent to the foregoing compounds for purposes of this invention are non-toxic acid addition salts of the amines comprehended when X in the formula represents a methylene radical. Such salts can be enformulated thus

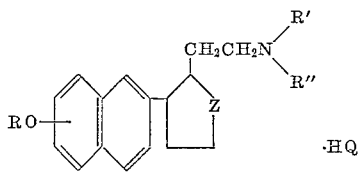

wherein R, R', R'', and Z are defined as before; and Q represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful by reason of their valuable pharmacological properties. Thus, inter alia, they are anti-cholesterologenic agents adapted to inhibit the incorporation of mavalonic acid during biosynthesis of cholesterol; and they are antibiotics variously effective against bacteria such as *Diplococcus pneumoniae*, fungi such as *Tricophyton mentagrophytes*, and cotyledenous seed germination. They also stimulate the central nervous system and counteract the edematous swelling characteristic of the inflammatory response to tissue insult.

Manufacture of the claimed compounds proceeds by converting an appropriately alkoxylated 5-(2-naphthyl)-2-oxocyclopentaneacetic acid of the formula

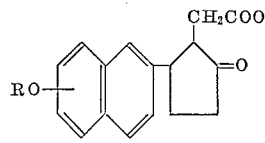

(R being defined as before) to the acid chloride with oxalyl chloride or the equivalent and reacting the latter in an inert solvent with an appropriate amine

(R' and R'' being defined as before) to produce the corresponding 5-(alkoxy-2-naphthyl)-N,N-dialkyl-2 - oxocyclopentaneacetamide. This, in turn, is reduced to the 2-hydroxy analog with sodium borohydride in alcoholic solvent; and the amide thus obtained is reduced to the amine with lithium aluminum hydride in ethereal, 1,2-dimethoxyethane. The resultant 3-(alkoxy-2-naphthyl)-2-(2-dialkylaminoethyl)cyclopentanol is oxidized to the corresponding cyclopentanone with chromium trioxide and pyridine.

Conversion of the amine bases of this invention to corresponding acid addition salts is accomplished by simple admixture of these compounds with one equivalent of any of various inorganic and strong organic acids, the anionic portion of which conforms to Q as hereinabove defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A. *5-(6-methoxy-2-naphthyl)-2 - oxocyclopentaneacetyl chloride.*—A mixture of 39 parts of 5-(6 - methoxy-2-naphthyl)-2-oxocyclopentaneacetic acid melting at 137–139° and 37 parts of oxalyl chloride, protected from moisture, is maintained at room temperatures overnight. The resultant brown solution is stripped of excess oxalyl chloride by vacuum distillation. The residue is 5-(6-methoxy-2-naphthyl)-2-oxocyclopentaneacetyl chloride.

B. *5-(6-methoxy-2-naphthyl)-N,N-dimethyl-2 - oxocyclopentaneacetamide.*—To a solution of approximately 40 parts of 5-(5-methoxy-2-naphthyl)-2-oxocyclopentaneacetyl chloride (prepared as described in the foregoing Part A of this example) in 175 parts of benzene at 0–5° is added, cautiously and portionwise, a cold solution of 50 parts of anhydrous dimethylamine in 85 parts of benzene. The resultant mixture is allowed to warm to room temperature during 2 hours, then diluted with 700 parts of ether and consecutively washed with water, 5% hydrochloric acid, water, aqueous 5% sodium bicarbonate, and water. The solution thus obtained is dried over anhydrous magnesium sulfate and stripped of solvent by distillation under nitrogen. The residue, preliminarily triturated with hexane and then recrystallized from a mixture of benzene and cyclohexane, affords 5-(6-methoxy-2-naphthyl)-N,N-dimethyl-2 - oxocyclopentaneacetamide melting at 124–126°. The product has the formula

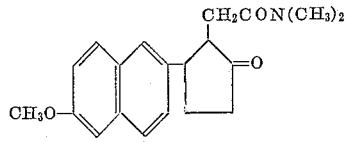

Example 2

*2-hydroxy-5-(6-methoxy - 2 - naphthyl)-N,N-dimethylcyclopentaneacetamide.*—A solution of 45 parts of 5-(6-methoxy-2-naphthyl)-N,N-dimethyl-2 - oxocyclopentaneacetamide (M.P. 124–126°) in a mixture of 2 parts of sodium borohydride with 320 parts of 2-propanol is allowed to stand at room temperatures overnight, then cautiously diluted with 50 parts of 20° acetic acid. The resultant solution is stripped of solvent by distillation under nitrogen. The residue is diluted with water to precipitate an oil which granulates on standing at room temperatures. The resultant soft solid is washed with water, dried, and taken up in 160 parts of methanol. Approximately 10 parts of potassium hydroxide is dissolved in this solution, which is thereupon allowed to stand at room temperatures overnight and then diluted with 100 parts of water and stripped of solvent by distillation. Approximately 400 parts of water is added to the residue, and the mixture thus obtained is extracted with 1:1 ethyl acetatebenzene. The extract is washed with water, dried over anhydrous sodium sulfate, and stripped of solvent by vacuum distillation. The residue thus obtained, preliminarily triturated with cyclohexane and then recrystallized from cyclohexane, affords 2-hydroxy-5-(6-methoxy-2 - naphthyl)-N,N-dimethylcyclopentaneacetamide melting at approximately 121–122°. The product has the formula

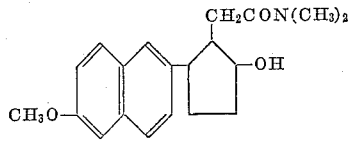

Example 3

A. *3-(6-methoxy-2-naphthyl)-2-(2 - dimethylaminoethyl)cyclopentanol.*—To a solution of 55 parts of 2-hydroxy-5-(6-methoxy-2 - naphthyl)-N,N-dimethylcyclopentaneacetamide (M.P. 121–122°) in 2500 parts of 1,2-dimethoxyethane is added a suspension of 20 parts of lithium aluminum hydride in 700 parts of ether. The resultant mixture is maintained with agitation for 1 hour at room temperatures, then allowed to stand at room temperatures overnight. The mixture is thereupon cooled to 0–5°, at which point 20 parts of water, 23 parts of aqueous 15% sodium hydroxide, and 60 parts of water are consecutively introduced. The mixture thus obtained is filtered, and the filtrate is stripped of solvent by vacuum distillation in a nitrogen atmosphere. The residue is 3-(6-methoxy-2-naphthyl)-2-(2 - dimethylaminoethyl)cyclopentanol, having the formula

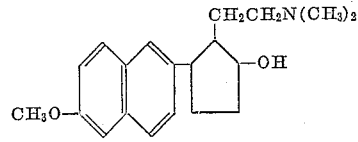

B. *3 - (6 - methoxy - 2-naphthyl)-2-(2-dimethylaminoethyl)cyclopentanol hydrochloride.*—To a solution of 10 parts of 3-(6-methoxy-2-naphthyl)-2-(2-dimethylaminoethyl)cyclopentanol (prepared by the procedure of the foregoing Part A of this example) in 300 parts of anhydrous ether is added a solution of 4 parts of anhydrous hydrogen chloride in 10 parts of 2-propanol. The gummy precipitate which quickly forms becomes crystalline on standing. Filtered off and recrystallized from a mixture of 2-propanol and ether, it melts at 173–175°. The product thus isolated is 3-(6-methoxy-2-naphthyl)-2-(2-dimethylaminoethyl)cyclopentanol hydrochloride.

Example 4

*3 - (6 - methoxy - 2 - naphthyl)-2-(2-dimethylaminoethyl)cyclopentanone.*—To a slurry of 4 parts of chromium trioxide in 40 parts of pyridine is added a solution of 4 parts of 3-(6-methoxy-2-naphthyl)-2-(2-dimethylaminoethyl)cyclopentanol (prepared by the procedure of Example 3A) in 20 parts of pyridine. The resultant mixture is maintained with agitation at room temperatures overnight, then diluted with 400 parts of water and 200 parts of chloroform. The mixture thus obtained is filtered. The chloroform phase is separated from the filtrate, the aqueous phase is extracted with chloroform, and the chloroform extract and original chloroform phase are combined. The combined solution is washed with water, dried over magnesium sulfate, and stripped of solvent by vacuum distillation. The residue is 3-(6-methoxy - 2-naphthyl)-2-(2-dimethylaminoethyl)cyclopentanone having the formula

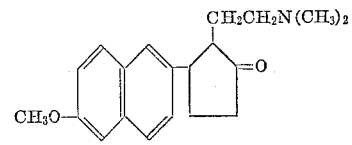

What is claimed is:
1. A compound of the formula

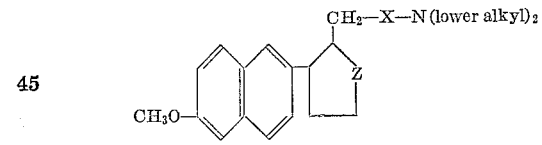

wherein X is selected from the group consisting of radicals of the formulas

—CO— and —CH$_2$— and Z is selected from the group consisting of radicals of the formulas

—CO— and —CHOH—

2. 5 - (6 - methoxy-2-naphthyl)-N,N-dimethyl-2-oxocyclopentaneacetamide.
3. 3 - (6 - methoxy-2-naphthyl)-2-(2-dimethylaminoethyl)cyclopentanone.
4. 2 - hydroxy - 5 - (6-methoxy-2-naphthyl)-N,N-dimethylcyclopentaneacetamide.
5. 3 - (6 - methoxy-2-naphthyl)-2-(2-dimethylaminoethyl)cyclopentanol.

No references cited.